United States Patent [19]

Orain

[11] Patent Number: 4,512,750

[45] Date of Patent: Apr. 23, 1985

[54] TRANSMISSION JOINT AND IN PARTICULAR AN ARTICULATED CONSTANT-SPEED JOINT FOR A MOTOR VEHICLE

[75] Inventor: Michel A. Orain, Conflans Sainte Honorine, France

[73] Assignee: Glaenzer Spicer, Poissy, France

[21] Appl. No.: 483,843

[22] Filed: Apr. 8, 1983

[30] Foreign Application Priority Data

Apr. 20, 1982 [FR] France .................... 82 06768

[51] Int. Cl.³ .................................... F16D 3/24
[52] U.S. Cl. ........................ 464/111; 464/132; 464/905
[58] Field of Search ........... 464/111, 122, 123, 124, 464/132, 905

[56] References Cited

U.S. PATENT DOCUMENTS

| | | | |
|---|---|---|---|
| 1,346,253 | 7/1920 | Rayfield | 464/132 X |
| 1,967,842 | 7/1934 | Raviola et al. | 464/122 X |
| 2,752,766 | 7/1956 | Wildhaber | 464/123 X |
| 2,884,772 | 5/1959 | Amberg | 464/106 X |
| 3,357,210 | 12/1967 | Dean | 464/124 |
| 3,381,497 | 5/1968 | Allen | 464/122 |
| 4,103,513 | 8/1978 | Grosser | 464/109 |

FOREIGN PATENT DOCUMENTS

| | | | |
|---|---|---|---|
| 568825 | 1/1933 | Fed. Rep. of Germany. | |
| 1341628 | 9/1963 | France | 464/111 |
| 2166689 | 8/1973 | France. | |
| 2045397 | 10/1980 | United Kingdom | 464/111 |
| 903609 | 2/1982 | U.S.S.R. | 464/111 |

Primary Examiner—Stuart S. Levy
Assistant Examiner—Daniel P. Stodola
Attorney, Agent, or Firm—Wenderoth, Lind & Ponack

[57] ABSTRACT

Each arm of a male element of a joint carries two roller sectors which are rotatively and slidably mounted on the arm, independent from each other and externally toric. The joint is of small size and has no angular play between the roller sectors and respective tracks.

18 Claims, 28 Drawing Figures

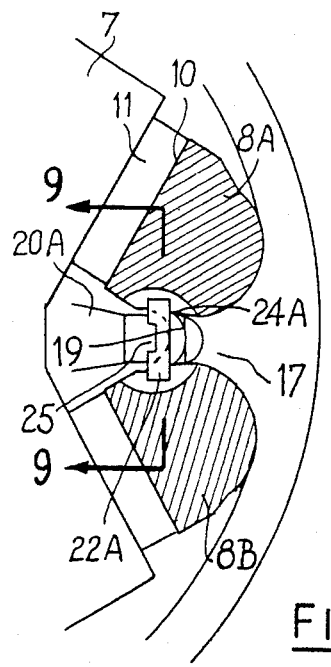
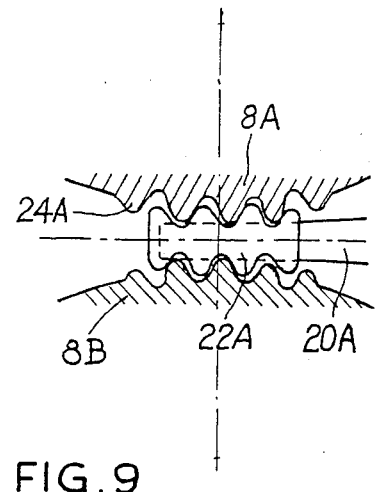
FIG. 8
FIG. 9
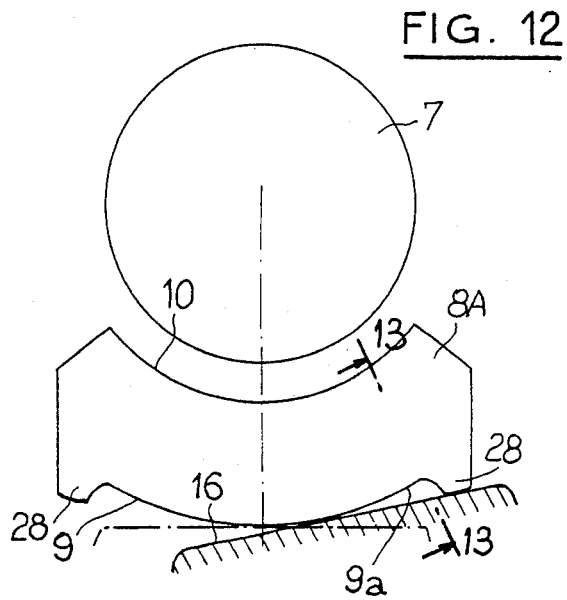
FIG. 12
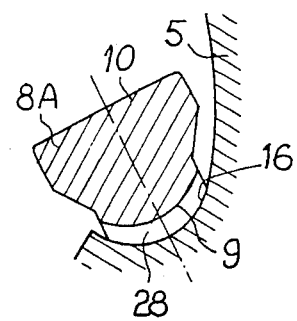
FIG. 13

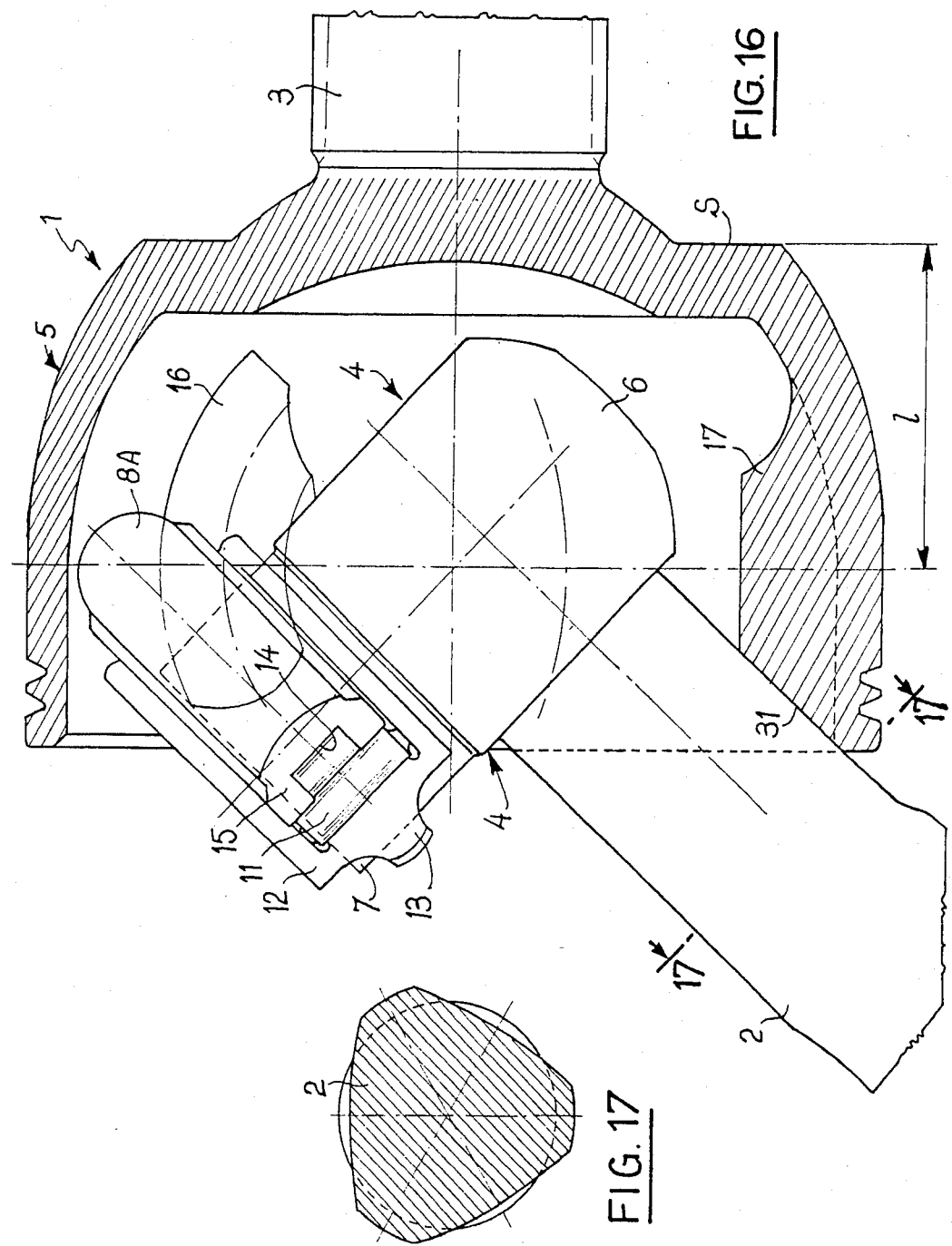

TRANSMISSION JOINT AND IN PARTICULAR AN ARTICULATED CONSTANT-SPEED JOINT FOR A MOTOR VEHICLE

DESCRIPTION

BACKGROUND OF THE INVENTION

The present invention relates to transmission joints of the type comprising a male element on each branch of which is mounted a rolling element which is trapped in a pair of tracks formed in a female element. The invention is more particularly applicable to articulated constant-speed joints employed in front-wheel drive motor vehicles.

The severe reductions in the consumption of energy sought after at the present time require that the constructors of motor vehicles seek light, cheap, constant-speed joints which have a long life and have practically no mechanical losses. At the same time, the requirements of comfort increase and modern constant-speed joints thus must not generate pulsating moments during their operation under application of torque and at an angle of operation, owing to the cyclic friction in their component parts, and must not have an angular play.

Now, it is known that all the known joints comprising rollers rolling between two tracks have a certain angular play resulting from the requirement that each roller does not touch the track opposed to that along which it rolls for the considered direction of the torque to be transmitted.

SUMMARY OF THE INVENTION

An object of the invention is to provide a transmission joint which combines the following properties:

inexpensive construction;

lightness and compactness;

high efficiency and silent operation achieved owing to the practically complete absence of friction, which reduces the requirement for lubrication and which dispenses with the need for cooling;

absence of an angular play, and, in the case of transmission joints for front drive wheels, large angle of operation.

The invention therefore provides a transmission joint of the aforementioned type, wherein each rolling element is formed by two separate sectors each of which cooperates with a track.

In an advantageous embodiment, applicable in particular to articulated constant-speed joints, the rolling surface of each sector and of each track is toric, and each sector is journalled and is movable on a cylindrical surface of the associated arm, optionally with the interposition of a row of needles retained by a cage.

In this case, in particular if the joint is an axially retained articulated joint, it is advantageous to arrange that the sector, or the associated needles, cooperate directly with the cylindrical surface of the arm which has a radial axis relative to the axis of rotation of the male element.

On the other hand, with respect to a sliding articulated joint, it is advantageous to arrange that each sector, or the associated needles, cooperate with a semi-bearing which is pivotally and slidably mounted on the cylindrical surface of the arm, the axis thereof being contained in a plane perpendicular to the axis of rotation of the male element.

Preferably, each sector comprises positive indexing means relative to its track, or, at least at each end, a retaining heel portion which is in radially outwardly projection relation.

Particular advantage is taken of the invention when all the sectors are mounted with radial pre-stressing.

BRIEF DESCRIPTION OF THE DRAWINGS

The invention is described hereinafter in more detail with reference to the accompanying drawings which show some embodiments thereof, and wherein

FIG. 8 is a partial cross-sectional view of a modification

FIG. 9 is a partial sectional view taken along line 9—9 of FIG. 8;

FIG. 12 is a diagrammatic illustration of another modification;

FIG. 13 is a partial sectional view taken along line 13—13 of FIG. 12;

FIG. 16 is a view, partly in axial section, of a transmission joint according to the invention, represented at its maximum break angle;

FIG. 17 is a sectional view taken along line 17—17 of FIG. 16;

DETAILED DESCRIPTION OF THE INVENTION

Figure 1:
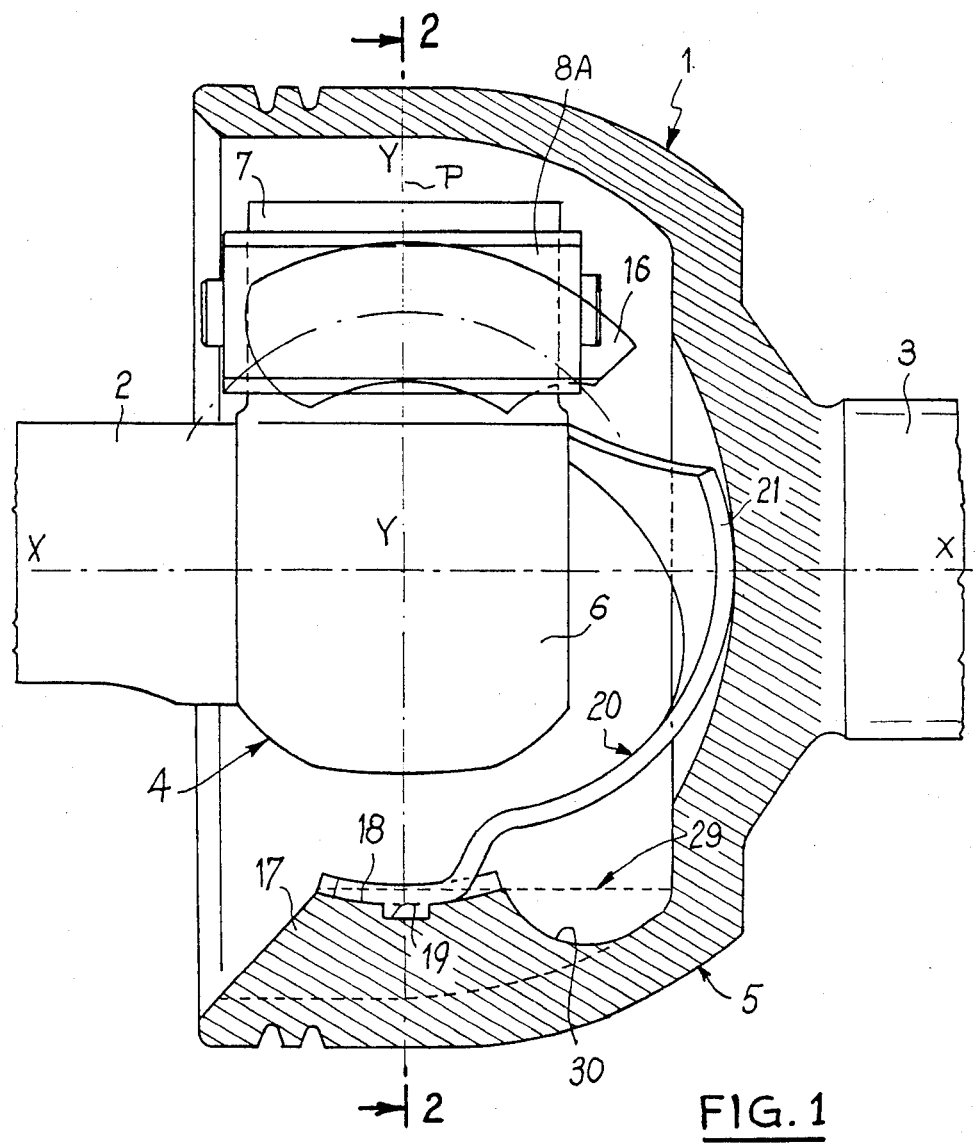
FIG. 1 is an axial sectional view of a transmission joint according to the invention, represented in the aligned position.

FIGS. 1 to 7 show a constant-speed joint, of the fixed type, ie. non-telescopic type, which connects a shaft 2 to a shaft 3. In particular, the shaft 2 may be a transverse suspended transmission shaft which is part of a transmission for a front-wheel drive motor vehicle, while the shaft 3 constitutes a front driving and steering wheel stub-axle.

The joint 1 comprises a male or tri-axial element 4 and a female or barrel element 5. The tri-axial element comprises a centre part 6 fixed coaxially to the end of the shaft 2 by welding or a splined assembly. Projecting from this part 6 are three trunnions or radial arms 7 angularly spaced 120° apart. Generally, in its illustrated aligned position, the joint 1 has a ternary symmetry about its axis of rotation X—X. Consequently, there will be described hereinafter only the part of the joint associated with a given arm 7 located in the upper part of FIGS. 1 and 2.

The considered arm 7 is cylindrical and has an axis Y—Y perpendicular to the axis X—X. There are slidably and rotatively mounted on the arm two separate and independent roller sectors 8A and 8B, each of which suspends an angle at the centre (relative to the axis Y—Y) of about 90° as can be seen clearly in FIG. 4.

Figure 4:
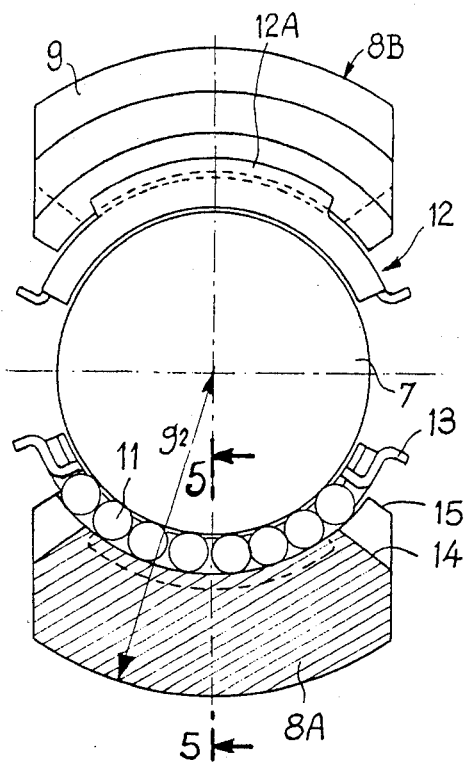
FIG. 4 is a sectional view taken along line 4—4 of FIG. 2.
Figure 5:
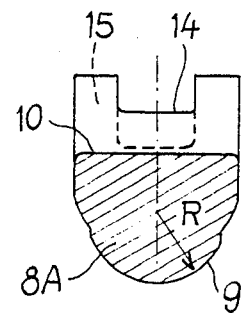
FIG. 5 is a sectional view taken along line 5—5 of FIG. 4.

Each sector 8A, 8B has a convex toric outer surface 9 and a cylindrical inner surface 10. Interposed between the latter and the cylindrical surface of the arm 7 is a row of needles 11 which are oriented axially and circumferentially retained, with an overall clearance, in a cage 12 devoid of separating means. Each cage extends angularly roughly to the same extent as the sectors 8A, 8B and has, on each transverse end, a nose portion 13 which is formed over outwardly. The confronting nose portions 13 can assume an end-of-travel abutment position disposed in notches 14 in the end faces 15 of the sectors, which notches may also assume an end-of-travel abutment position. In the illustrated embodiment, the surfaces 15 are planar in pairs in the centered position of the two sectors (FIG. 4). The recesses 14 enable the sectors to move in each direction through sufficient distance relative to the cage 12.

Further, the cages have two lateral flanges 12A for axially retaining the needles. These flanges cooperate with axial ends of the sectors so as to retain axially the cages relative to the sectors and they also include bosses 12B (FIG. 2) which project axially outwardly and in which are received the ends 11A of reduced diameter of the needles 11 so as to ensure the radial connection between the needles and the cage.

Figure 2:
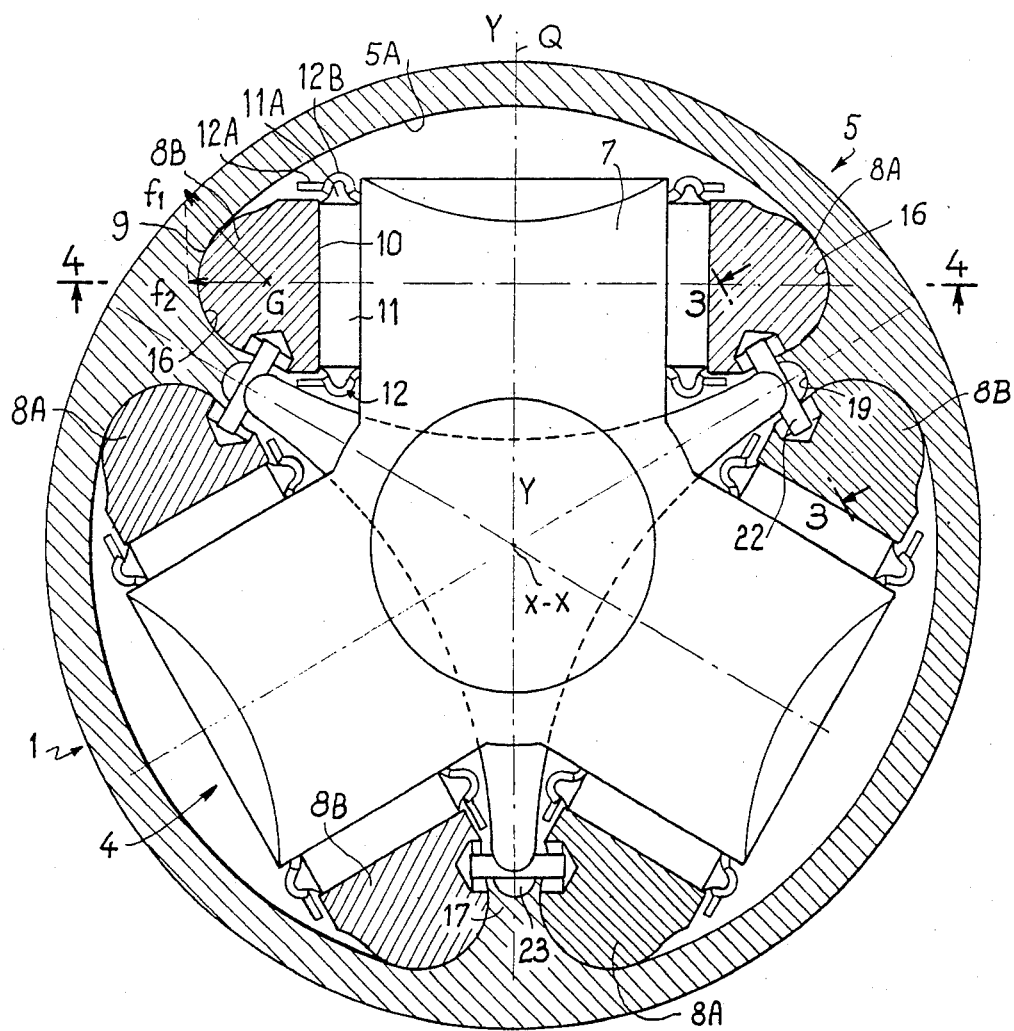
FIG. 2 is a sectional view taken along line 2—2 of FIG. 1.

The barrel element 5 has the general shape of a segment of a hollow and blind sphere which extends on each side of a diametral plane P perpendicular to the axis X—X and constituting the plane of FIG. 2. Its inner surface has, for each arm 7, two confronting concave tracks 16 which are symmetrical relative to the axial plane Q of the barrel element which contains the axis Y—Y, the line through the centres of these tracks being parallel to this plane Q. Each of the sectors 8A, 8B is trapped between the arms 7 (through the medium of the needles 11) and the adjacent track 16. The tracks 16 are toric and extend, in section, on an arc which is smaller than the surfaces 9 so as to allow the sectors to pivot slightly.

In operation, with respect to each of the trunnions 7, two rolling sectors 8A and 8B thus transmit the load between the tri-axial element 4 and the barrel element 5, in accordance with the direction of the torque to be transmitted. Irrespective of the direction of the torque, the two sectors bear against and roll along their respective tracks 16 substantially without sliding. This feature permits a radial pre-loading of the six sectors without mechanical loss and avoids any angular play in the joint, in contrast to the situation in conventional tripod joints having annular rollers.

Figure 6:
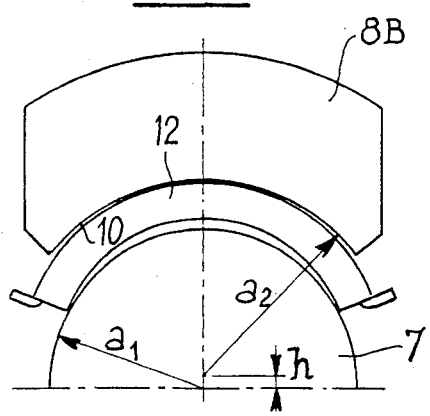
FIG. 6 is a diagrammatic illustration of the mounting of a segment on its arm.

FIGS. 4 to 7 show some advantageous details of the construction of the joint:

the radius R of the arc of a circle generating the outer surface 9 of the sectors is very much smaller than the radius $g_2$ of the apex of the arc relative to the axis Y—Y. Preferably, the ratio $g_2/R$ is of the order of 4 to 6;

the cages may advantageously have in the free state (FIG. 6) a curvature less than the curvature in the operating position once the sectors are assembled in the barrel element (FIG. 6). In FIG. 6, $a_1$ designates the radius of the trunnion 7, $a_2$ the inside radius of the sector, and h the distance between the centres of the radii $a_1$ and $a_2$ when the sector, the cage and the trunnion are in contact but under no load. After assembly, the two centres coincide and the resilient reaction of the cage maintains a pre-loading on the two sectors with a deflection of magnitude h;

the force applied on the needles when the sectors are under load may be equally distributed for a given force; for this purpose, the bore of the sectors is machined at the radius $a_2$ which is less than the value calculated by adding the radius $a_1$ of the trunnion 7 and the diameter d of the needles (FIG. 7):

$$a_2 < a_1 + d$$

In this way, the deflection of the sector under a given load F may be compensated for in such manner that all the needles are equally under load, which results in a maximum load capacity.

Figure 7:
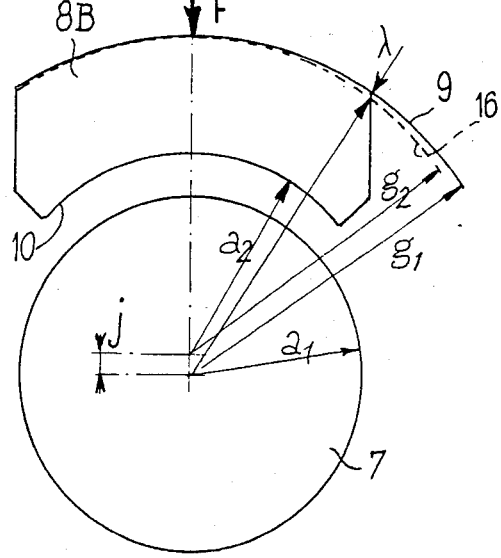
FIG. 7 is a diagrammatic illustration of a detail of the segments.

At high rotational speeds, the sectors are returned to the median position by the action of the centrifugal force $f_1$ (FIG. 2) applied to the centre of gravity G of the sector, since its component $f_2$ perpendicular to the trunnion tends to return the sector to the plane of the tri-axial element (the plane of the three axes Y—Y of the trunnions). With respect to low speeds, which usually correspond to high torque, the force $f_2$ may be insufficient, but there is then used the force F applied to the sector. Indeed, this force tends to return the sectors to the median position if, as shown in FIG. 7, care is taken to shift slightly the centre of the outer toric surface 9 of the sector, which has radius $g_1$, relative to the centre of the bore of the sector, which has a radius $a_2$, to an extent j, so that the sector is very slightly thicker by an amount λ at its ends than at its centre.

More precisely, with such an offset, the return force T which is a function of the transmitted load F, the offset j and the angle of rotation ψ of the sector relative to its centered position, is given by:

$$T = \frac{F \cdot j \cdot \sin \psi}{b_2}$$

For example, for a transmitted load F=1,000 kg, an angle of rotation ψ=30°, an offset j=0.2 mm and a radius $a_2$=16.5 mm, the return force T applied to the sector will be:

$$T = \frac{1000 \times 0.2 \times \sin 30°}{16.5} = 6.060 \text{ kg}$$

Apart from these features which tend to ensure the natural re-centering of the sectors, means may be provided for positively indexing or positioning each sector relative to its track.

Figure 3:
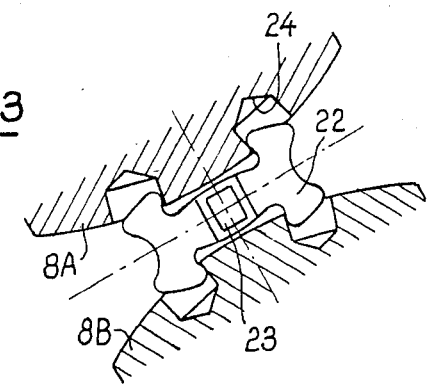
FIG. 3 is a partial sectional view taken along line 3—3 of FIG. 2.

FIGS. 1 to 3 show a first embodiment of such indexing means. Each rib 17 between two adjacent tracks 16 has a slightly concave apex 18 in the middle of the length of which is formed a transverse recess 19. A three-branched spider element 20 of spring steel bears by its central region 21 against the end of the barrel elements and has at the end of each branch an H-shaped rack element 22 which is resiliently applied on an apex 18. The rack element 22 has a projection 23 received in the recess 19 for its axial positioning. Each tooth of the H-shaped element cooperates with a cavity 24 of larger depth provided in the median part of the radially inner side of a respective sector 8A, 8B in the manner of a rack and pinion wheel so as to index this sector.

In the modification of FIGS. 8 and 9, the sectors each carry in the median part of their radially inner side teeth 24A which are die-formed at the moment of their original shaping, and therefore without great precision, which mesh with a rack element 22A of sheet metal fitted in the recess 19 of the respective rub of the barrel. The three-branched spider element 20A is here separate from the rack elements 22A and resiliently maintains these rack elements against the respective ribs 17. The spider element is held axially in position by shoulders on the ends of the branches of the spider element and is held circumferentially in position by cooperation of projections 25 of these branches with respective axial cavities in the rack elements.

Figure 10:
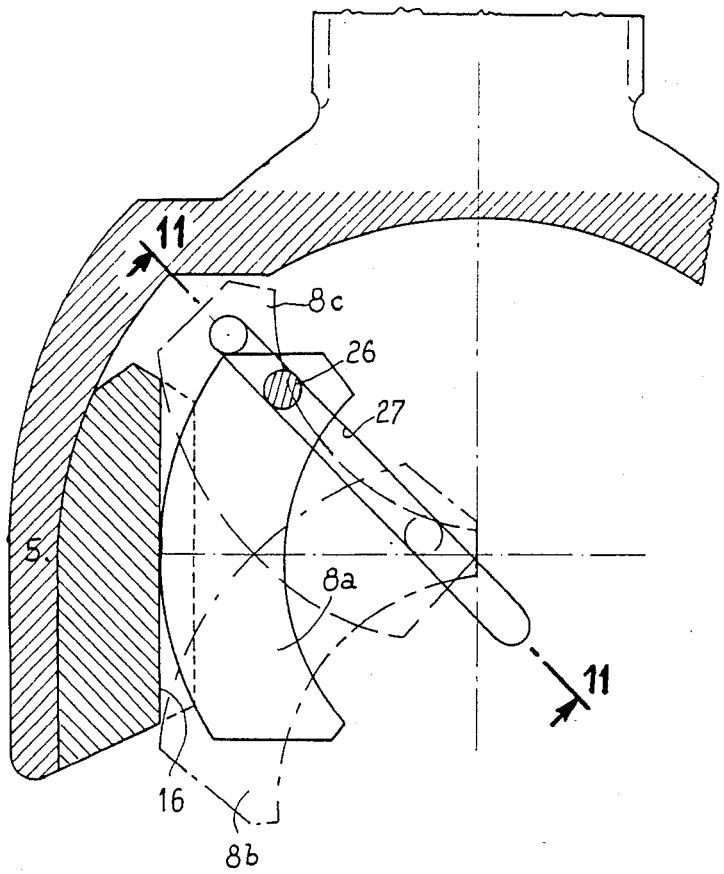
FIG. 10 is a diagrammatic illustration of another modification.
Figure 11:
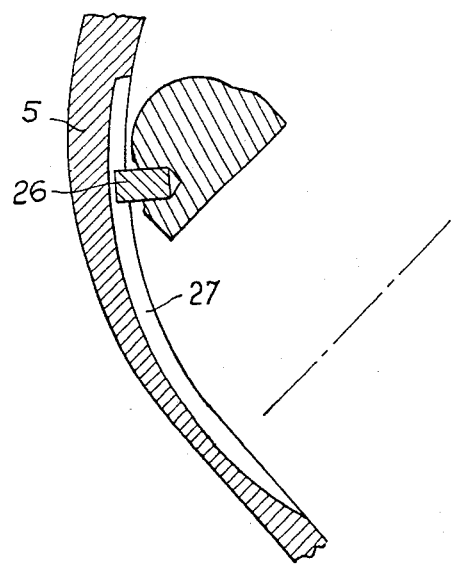
FIG. 11 is a partial sectional view taken alone line 11—11 of FIG. 10.

FIGS. 10 and 11 show diagrammatically another arrangement for holding the sectors with respect to the barrel element. In FIG. 10, a segment is shown in the median position 8a and in its end positions 8b and 8c. In order to render the Figure more clear and simple, the path of the sector has been illustrated on a rectilinear track 16 whereas it is in fact toric.

The sector carries on one side a cylindrical pin 26 which projects therefrom and slides in a groove 27 machined in the spherical inner region of the barrel element 5. In this way the position of the segment is defined positively as a function of the inclination of the trunnion concerned. The groove may be replaced by a cam of thin sheet metal attached to the end of the barrel element.

FIGS. 12 and 13 show a device for retaining the sectors without a positive indexing. The toric surface 9 of each sector has at each end a heel 28 which projects radially outwardly and has a circular section which bears against the track 16 if, for some accidental reason, the sector is offset relative to the track, as shown. The sector then slides along the track until the moment when the toric region 9a adjacent to the heel bears against the track, the rear of the heel having passed the end of this track. The automatic re-setting of the sector is thus ensured in the relative position indicated in dot-dash lines in FIG. 12.

Figures 14, 15:
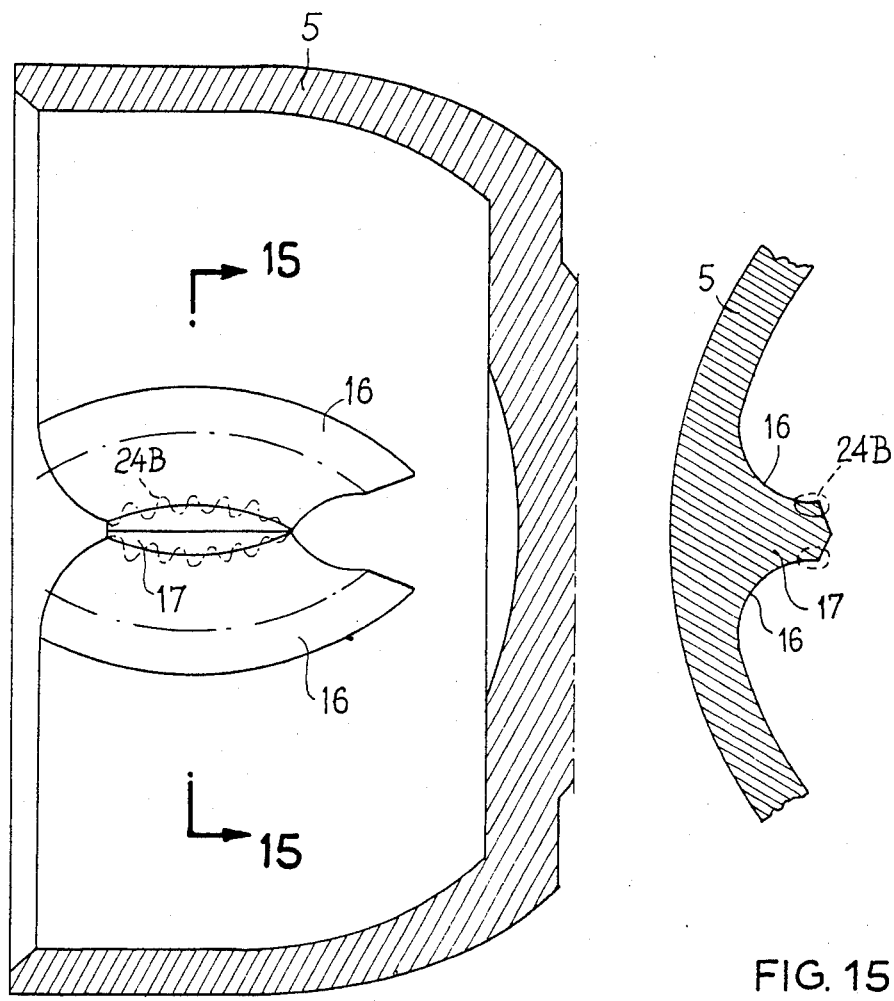
FIG. 14 is an axial sectional view of the female element of a joint according to the invention.
FIG. 15 is a partial sectional view taken along line 15—15 of FIG. 14.

FIGS. 14 and 15 show two contiguous tracks 16 viewed from the interior of the barrel element 5. These two tracks are backed against the rib 17 which may be cold-formed by means of a triple radially expanding tool employed in a known technique, since this rib and the two tracks it supports have a draught in a radial direction. The teeth 24B shown in dotted lines may be produced in the same cold-forming operation and advantageously replace the rack element and the spider element of FIGS. 1 to 9. The base element may be a barrel/stub axle unit obtained by extrusion with an inner contour without a counter-draught shown by the inner contours of FIG. 1 and the dotted line 29, the recess 30 located behind the tracks at the inner end of the barrel element being formed on a lathe.

FIGS. 16 and 17 show the constant-speed joint according to the invention in section and at the maximum break angle. The two sectors are in contact by their inner abutment surfaces 15 in the position 8b of FIG. 10. The shaft 2 is substantially tangent to a chamfer 31 of a rib 17 defining the tracks on the edge of the barrel element. In order to increase the break angle, the shaft 2 may be advantageously shaped as shown in FIG. 17 with a curvilinear equilateral triangular section having truncated corners in the region tangent to the chamfer 31. This contour may also act as a junction with the triaxial element 4 which is then broached at the same contour, i.e. the shaft is fitted in the contoured aperture of the tri-axial element and retained by circlips in accordance with the known technique.

Figure 20:
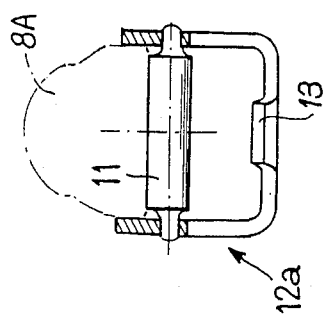
FIG. 20 is a sectional view taken along line 20—20 of FIG. 18 of the cage provided with needles.
Figure 18:
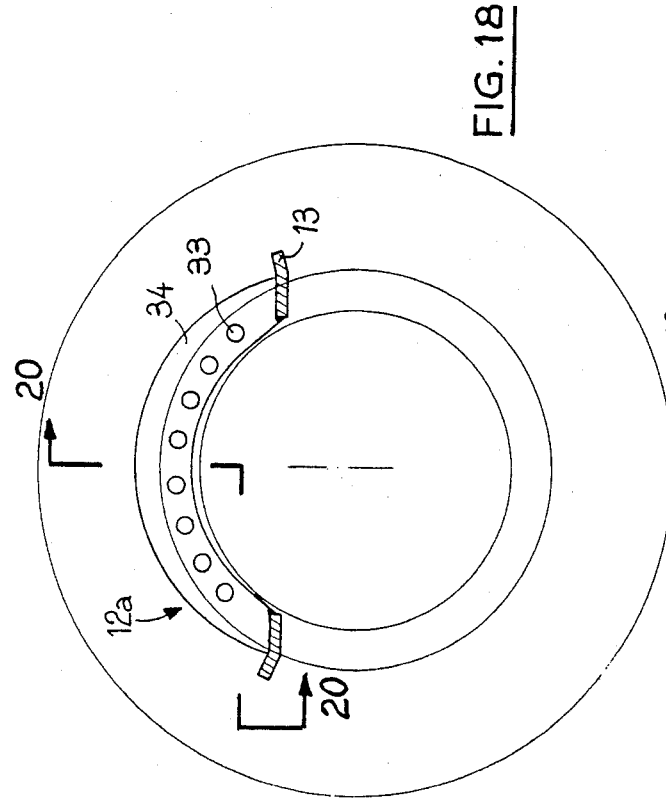
FIG. 18 is an elevational view of a modification of the cage for a joint according to the invention.
Figure 19:
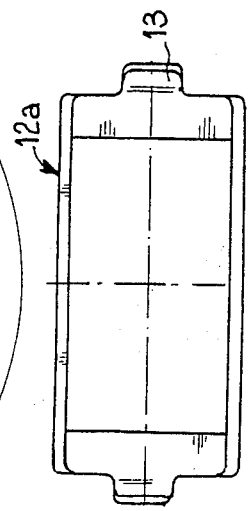
FIG. 19 is a plan view of said cage.

The conventional type of needle cage 12 shown in FIGS. 2, 4, 6 and 16 may be advantageously replaced by a cage 12a shown in FIGS. 18 to 20. This cage is made from a blank of sheet steel which is blanked out and pierced on a mass-production press tool and folded into the shape of a U along two longitudinal fold lines when assembling the needles 11, only one of which is shown in FIG. 20 for reasons of clarity. The ends of reduced diameter of these needles are journalled in two rows of apertures 33 formed in the flanges 34 of the cage and are thus maintained in spaced-apart relation so as to avoid any friction therebetween. The radially inner generatrix of the needles 11 is positioned slightly beyond the cage so as to permit the needles to roll on the trunnion 7.

Figure 21:
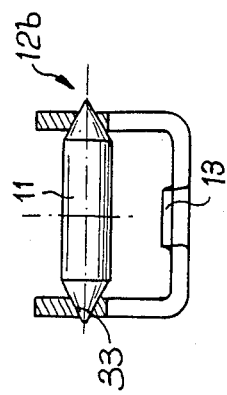
FIG. 21 is a view similar to FIG. 20 of a modification of the needle cage.

FIG. 21 shows a modification of this cage intended for the use of needles 11 having conical ends. Apart from the configuration of the apertures 33 which are conical, the cage 12b of FIG. 21 is similar to that of FIGS. 18 to 20. Other known types of cages may be employed within the scope of the invention. Those which permit the accommodation of the largest projected surface of needles result in the greatest torque transmitting capacity.

Figure 22:
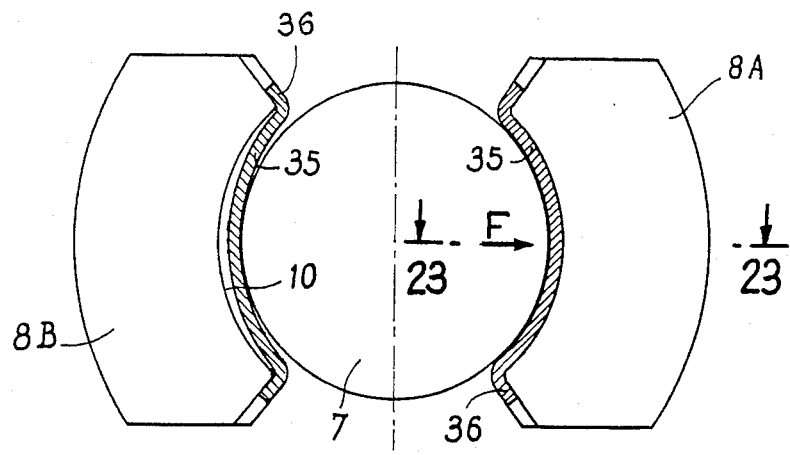
FIG. 22 is a diagrammatic illustration of another modification of the joint according to the invention.
Figure 23:
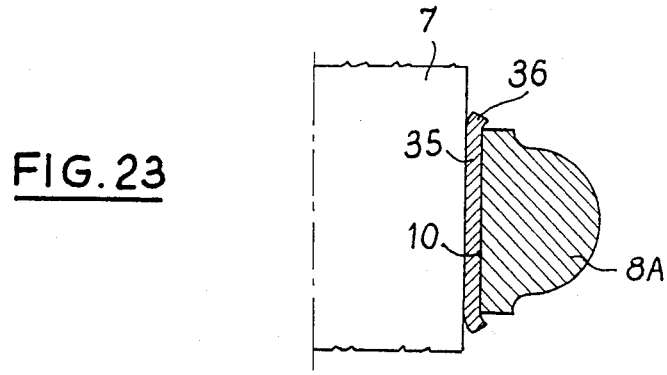
FIG. 23 is a sectional view taken along line 23—23 of FIG. 22.

As shown in FIGS. 22 and 23, each sector 8A, 8B may be mounted on its arms 7 by means of a thin, preferably self-lubricating, bearing bush 35. This bearing bush may have flanges 36 for circumferentially and axially positioning it relative to the sector and may have, at rest, a curvature less than that of the arm 7 so as to take up the radial clearance as illustrated on the left half of FIG. 22.

Figure 24:
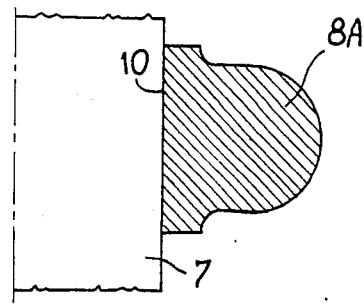
FIG. 24 is a view similar to FIG. 23 and of another modification.
Figure 25:
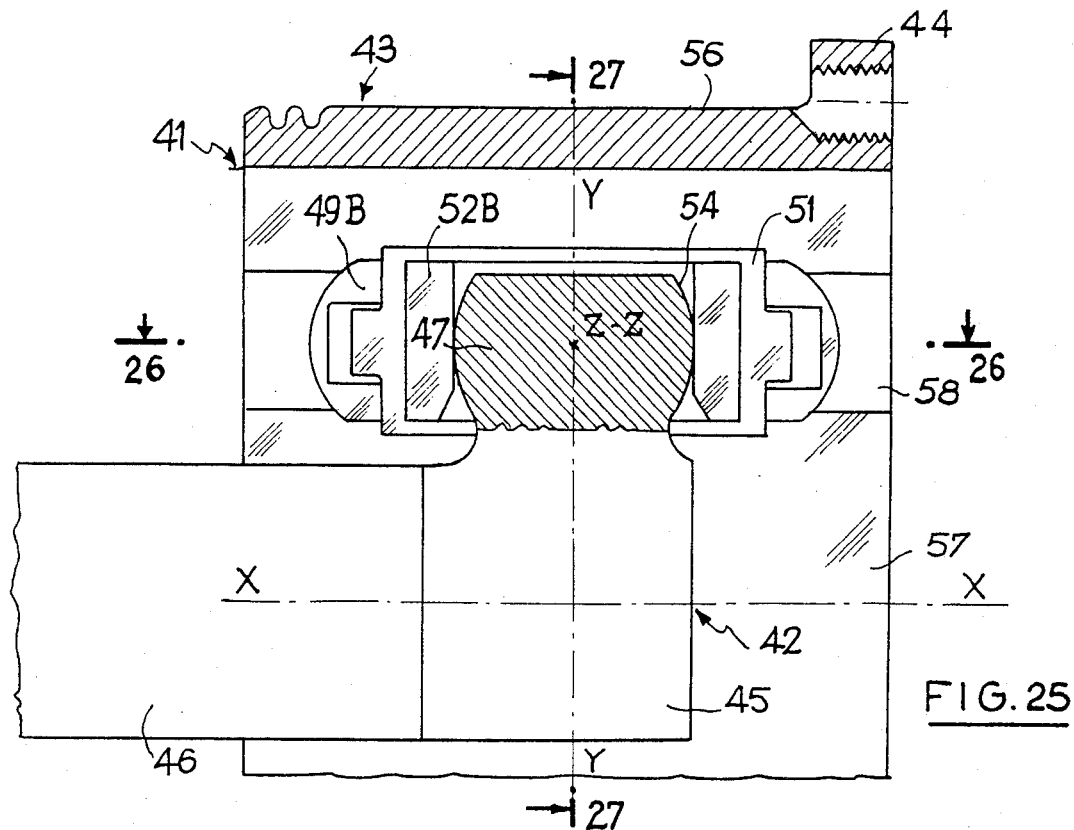
FIG. 25 is a longitudinal sectional view of another embodiment of the transmission joint according to the invention.
Figure 26:
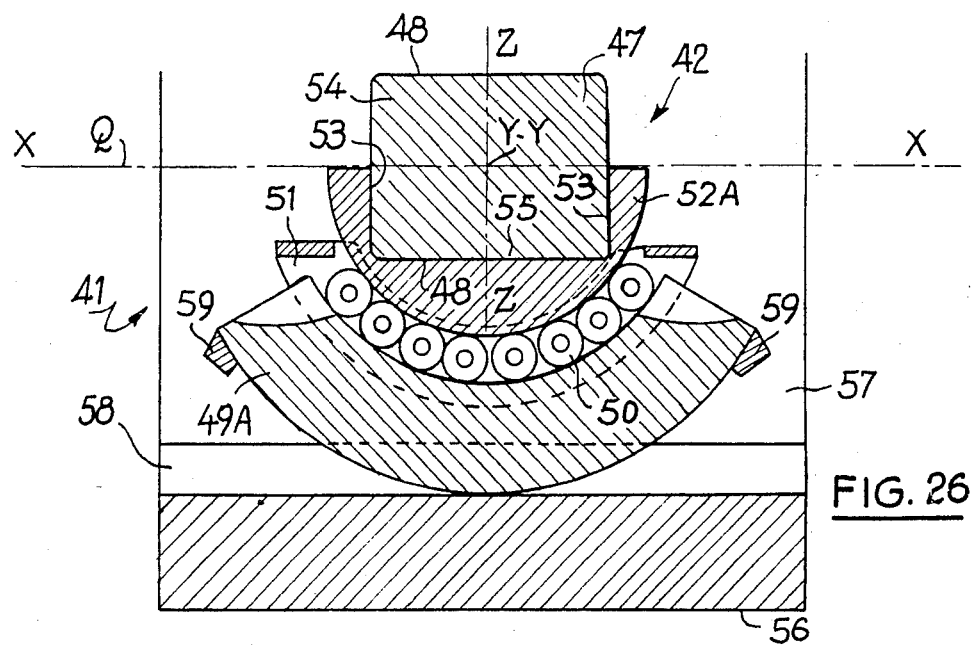
FIG. 26 is a half-sectional view taken along line 26—26 of FIG. 25.

As shown in FIG. 24, each sector may also be journalled directly by its bore 10 on the arm 7.

The transmission joint according to the invention has many important advantages:

Inexpensive construction:

This joint does not have a system for bisecting the angle of the two shafts 2 and 3. Consequently, it only has elements connected to one or the other shaft and serving to transmit the torque directly. Further, the connection obtained is completely isostatic so that errors in manufacture or deformations under transmission of torque are allowable without inconvenience of the quality of operation.

The main elements, namely the tri-axial element, the sectors and the barrel element, are simple to manufacture either by conventional machining or by a cold-forming operation. The sectors must be subjected to a single grinding operation on their bore 10, which may be carried out by means of grinding wheels of large diameter operating on sectors assembled in side-by-side relation since the bore 10 is open. Consequently, the grinding operation is inexpensive. As concerns the tracks, they require no grinding owing to the simultaneous rolling without sliding of all the sectors. The tri-axial element is ground at the trunnions by conventional currently employed means.

Lightness, compactness and large angle of operation:

When an arm 7 moves relative to the barrel element 5 in a given axial direction, the two associated sectors 8A, 8B become grouped on the other side of this arm. As a result, the arm can considerably approach the inner end of the barrel element and the sectors do not interfere and do not project out of the barrel element when the joint is broken.

For this reason, the distance 1 (FIG. 16) between the plane S in which the barrel element bears against the wheel hub (not shown) and the centre O of articulation of the joint is shorter than in any other known joint of the same capacity and the joint may attain a break angle of 47° or even more.

Further, the joint of the invention is small and light compared to the torque and power it is capable of transmitting and to its service life. Indeed, no presently known joint enables rollers and trunnions having needles of such a large diameter to be disposed in the joint for the same outside diameter of the barrel element.

High efficiency:

This is achieved by the substantial total absence of friction. The sectors having a large rolling radius roll externally without sliding, always in the direction of their longitudinal plane of symmetry, and internally on the needles. Further, the absence of friction has the fortunate effect of avoiding pulsating friction moments which appear in known joints. Thus, the operation at an angle and under torque occurs smoothly and provides an increased comfort. Moreover, this high efficiency allows a precarious lubrication and dispenses with the need for cooling.

Absence of angular play:

As the sectors may be radially pre-stressed on their tracks without resulting in losses by the effect of friction or "hard points", reversing the transmission of torque occurs without noise since there is no discontinuity of contact in the rolling elements of the joint.

Self-retention of the tri-axial element in the axial direction:

The fact that the six sectors 8A, 8B which are externally toric are guided in the tracks 16 of the barrel element and on the three arms 7, in itself constrains the centre of the tri-axial element to coincide permanently with the centre of the barrel element. Thus, the tri-axial element remains axially fixed with no need for any particular retaining means. In order to improve the guiding in the region of the outer edges of the tracks 16, the latter may be extended by a small spherical region centered on the centre of the barrel element, the toric surfaces 9 and 16 being then tangent to each other and to this sphere at the same point of each side of the plane Q. In FIG. 2, the spherical region interconnects the edge of the tracks and forms the general inner surface 5A of the barrel element.

FIGS. 25 to 28 illustrate the application of the invention to a constant-speed transmission joint 41 of the sliding or telescopic type. This joint comprises a tri-axial element 42 and a tubular barrel element 43 provided with a connecting flange 44 at one end.

The tri-axial element 42 has a central hub 45 fixed to the end of a transmission shaft 46 having an axis X—X, and three radial arms 47 having axes Y—Y angularly spaced 120° apart from each other and each having the shape of a cylinder whose axis Z—Z is perpendicular to the axes X—X and Y—Y and whose bases 48 are parallel to the radial plane Q containing the axes X—X and Y—Y.

Each arm 47 carries two roller sectors 49A, 49B which are externally toric and internally cylindrical, with interposition of axial needles 50 retained by a cage 51, as in the previously-described embodiments. However, in the case of the joint 41, the needles 50 roll along a cylindrical surface having an axis Y—Y of two semi-bearings 52A, 52B respectively associated with the two sectors. The inner bore of each semi-bearing has a constant open rectangular section, the two small sides 53 of this bore cooperating with the cylindrical surfaces 54 of the arm 47, while its large side 55, which constitutes the bottom thereof, slides along the respective planar surface 48 of this the arm.

The barrel element 43 has a cylindrical outer surface 56 having a circular section and an inner surface 57 having a similar general shape. Provided in the latter are three pairs of tracks 58 which have a circular section and are in confronting relation in pairs as before. However, here, a line through the centres of each track is rectilinear and parallel to the axis X—X. The arc of the tracks in cross-section is of the order of 110° to 140°.

Figure 27:
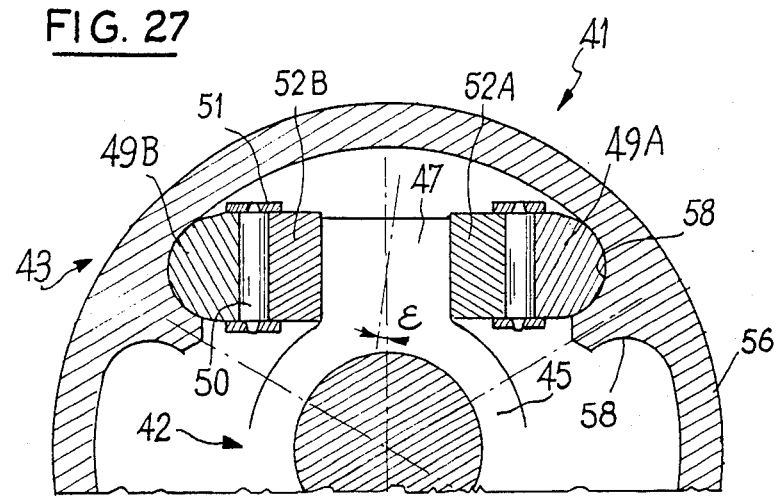
FIG. 27 is a half-sectional view taken along line 27—27 of FIG. 25.
Figure 28:
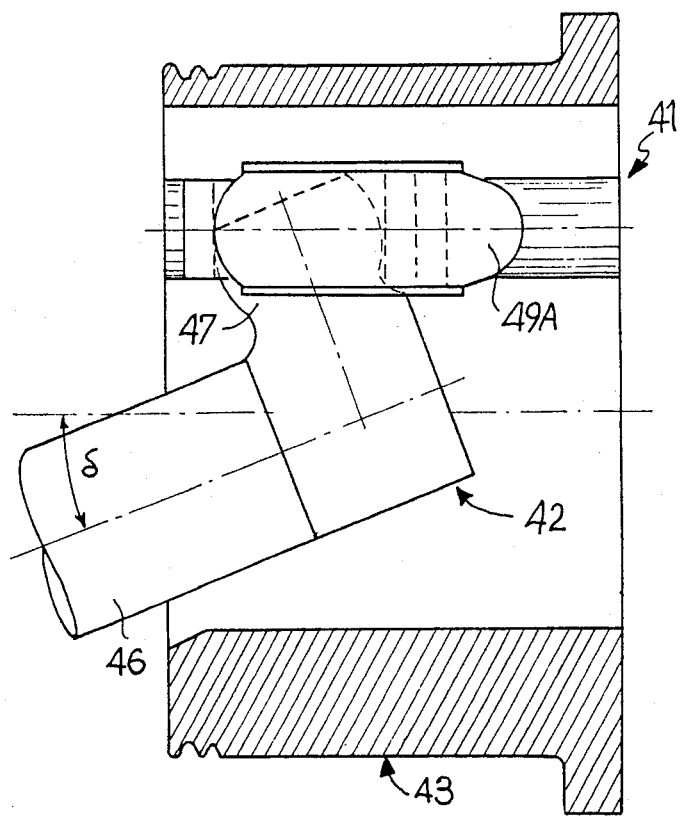
FIG. 28 is a view similar to FIG. 25 showing the joint in the broken condition.

As can be seen in FIG. 28, the shaft 46 can be inclined at an angle δ with respect to the axis of the barrel element 43, the sectors 49A and 49B permanently remaining in the planes of the corresponding pairs of tracks. The cooperation of the arms 47 and the bores of the semi-bearings allows this inclination and the sliding of the sectors along the arms. The independence of the two sector-cage-semi-bearing assemblies of each arm and the toric shape of the rolling surfaces moreover allows a small inclination Σ of the axis Y—Y in a transverse plane relative to the radial direction of the barrel element, as illustrated in FIG. 27.

As before, in operation, the sectors roll without sliding along the tracks 58. However, for more safety, it may be desirable to dispose at each end of each sector a retaining block 59 similar to the heel 28 of FIGS. 12 and 13.

The constant-speed joint 41 is a sliding joint of high efficiency and without angular play which has a high power transmitting capacity for a small volume.

The invention may also be applicable to other types of articulated or non-articulated, constant-speed or non-constant-speed, transmission joints, irrespective of the number of arms of the male element. Further, by way of a modification, the toric surfaces of the rollers could be concave and those of the tracks convex.

Having now described my invention what I claim as new and desire to secure by Letters Patent is:

1. A constant-speed transmission joint for transmitting rotation of a driving shaft to a driven shaft while enabling angular displacement therebetween, said joint comprising:

a barrel element rigid with the driven shaft, said barrel element defining therein three pairs of tracks;

a tripod element rigid with the driving shaft and rotatable thereby about an axle, said tripod element extendng into said barrel element and having three radially extending arms;

three rolling means rotatively mounted on respective said arms for transmitting rotation of said tripod element to said barrel element while enabling angular displacement of said axis of said tripod element relative to the axis of rotation of said barrel element;

each said rolling means comprising two separate roller sectors disposed on opposite sides of a respective said arm and cooperating with a respective said pair of tracks; and each said roller sector and the respective said track having cooperating surfaces enabling rolling movement therebetween without substantial sliding movement therebetween.

2. A joint as claimed in claim 1, wherein all said roller sectors are mounted on the respective said arms in a radially pre-stressed condition.

3. A joint as claimed in claim 1, wherein each said roller sector has at each end thereof a radially outwardly projecting retaining heel.

4. A joint as claimed in claim 1, further comprising means for positively indexing each said roller sector relative to its respective track.

5. A joint as claimed in claim 4, wherein said indexing means comprise interengaging teeth provided on sides of said roller sectors and on the respective said tracks.

6. A joint as claimed in claim 4, wherein said indexing means comprise a lug projecting from each said roller sector and means defining a guiding groove rigid with said barrel element and receiving said lug.

7. A joint as claimed in claim 1, wherein said cooperating surfaces of each said roller sector and the respective said track comprise toric rolling surfaces.

8. A joint as claimed in claim 7, wherein each said roller sector has an outer surface generated by an arc of a circle having a first radius which is smaller than a second radius of the apex of the arc of said toric surface of said roller surface.

9. A joint as claimed in claim 8, wherein the ratio of said second radius to said first radius is 4 to 6.

10. A joint as claimed in claim 1, wherein each said arm has a cylindrical surface and each said roller sector is rotatively and slidably mounted on the said cylindrical surface of the respective said arm.

11. A joint as claimed in claim 10, wherein each said roller sector directly cooperates with said cylindrical surface of the respective said arm, and said arms have axes extending radially relative to said axis of rotation of said tripod element.

12. A joint as claimed in claim 10, wherein each said roller sector cooperates with a semi-bearing which is pivotally and slidably mounted on said cylindrical surface of the respective said arm which has an axis contained in a plane perpendicular to said axis of rotation of said tripod element.

13. A joint as claimed in claim 10, further comprising a row of needles and a cage for retaining said needles interposed between each said roller sector and said cylindrical surface of the respective said arm.

14. A joint as claimed in claim 13, wherein said rows of needles directly cooperate with said cylindrical surface of the respective said arm, and said arms have axes extending radially relative to said axis of rotation of said tripod element.

15. A joint as claimed in claim 13, wherein each said row of needles cooperates with a semi-bearing which is pivotally and slidably mounted on said cylindrical surface of the respective said arm which has an axis contained in a plane perpendicular to said axis of rotation of said tripod element.

16. A joint as claimed in claim 13, wherein each said cage has at each circumferential end thereof a nose portion capable of being disposed in a recess in a corresponding end face of the respective said roller sector.

17. A joint as claimed in claim 13, wherein each said cage is mounted in a pre-stressed condition between the respective said roller sector and the respective said arm by a resilient radial deformation of said cage.

18. A joint as claimed in claim 13, wherein each said cage comprises a member constructed from a sheet of metal which is blanked, pierced and folded into a U-shape defining two flanges each having a series of apertures which receive end portions of reduced diameter of said needles.

* * * * *